J. R. AYOTTE.
WHEEL.
APPLICATION FILED MAY 25, 1914.

1,142,226.

Patented June 8, 1915.

Witnesses:
Walter F. Stone.
Robert S. Martin

Inventor:
Joseph René Ayotte
By Rummler & Rummler,
Attys.

THE NORRIS PETERS CO., PHOTO-LITHO., WASHINGTON, D. C.

UNITED STATES PATENT OFFICE.

JOSEPH RENÉ AYOTTE, OF CHICAGO, ILLINOIS, ASSIGNOR TO RENÉ WHEEL COMPANY, OF CHICAGO, ILLINOIS, A CORPORATION OF ILLINOIS.

WHEEL.

1,142,226. Specification of Letters Patent. Patented June 8, 1915.

Application filed May 25, 1914. Serial No. 840,930.

*To all whom it may concern:*

Be it known that I, JOSEPH RENÉ AYOTTE, a subject of the King of England, and a resident of Chicago, county of Cook, and State of Illinois, have invented certain new and useful Improvements in Wheels, of which the following is a specification.

The main objects of this invention are to provide an improved form of wheel particularly adapted for use on large trucks and the like; to provide an improved construction of the rim of the wheel for supporting a resilient tire thereon; and to provide simple and improved means for supporting the rim on the wheel and for adjusting it so as to firmly secure the resilient tire in place.

Figure 1:
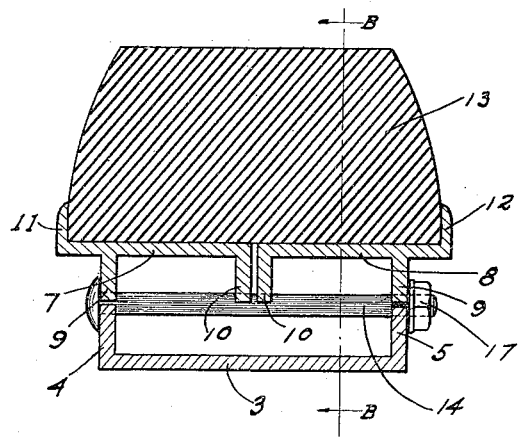
Figure 2:
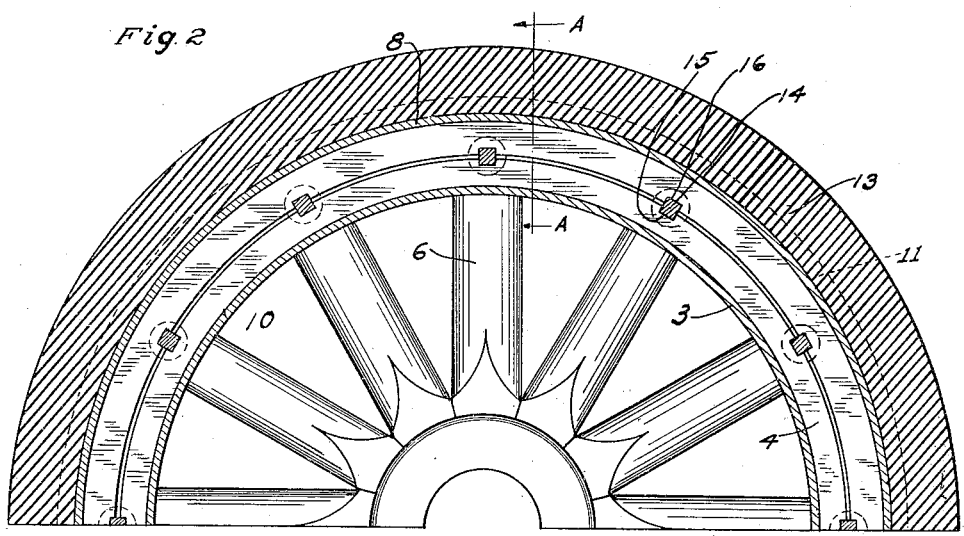

An illustrative embodiment of this invention is shown in the accompanying drawings, in which:

Figure 1 is a transverse sectional view of the improved form of wheel, the section being taken on the line A—A of Fig. 2. Fig. 2 is a sectional view of the wheel taken on the line B—B of Fig. 1.

In the construction shown in the drawings, a channel-shaped rim member 3, having outwardly disposed flanges 4 and 5 at the edges thereof, is suitably supported on the spokes 6 of the wheel. This member is preferably a metal casting and the spokes 6 are secured thereto in any suitable manner.

A pair of rim rings 7 and 8, also substantially channel-shaped, are supported on the rim member 3 with the inwardly disposed flanges 9 and 10 thereof opposed to the flanges of the rim member 3, the flanges 9 on the two rings registering with the flanges 4 and 5 respectively of said rim member 3. Outwardly disposed flanges 11 and 12 are also formed on the rim rings 7 and 8 overhanging the flanges 9 and are arranged to clamp a resilient tire 13 supported on said rings when the rings are shifted together.

The adjustment of the rings 7 and 8 is obtained by a plurality of bolts 14, preferably of rectangular cross-section, seated in recesses 15 formed in the flanges 4 and 5 and engaging recesses 16 formed in the flanges 9 and 10 of the rings 7 and 8. The nuts 17 are adapted to be turned so as to cause the heads and nuts to act upon the flanges 9 for urging the members 7 and 8 toward each other and causing the flanges 11 and 12 to securely clamp the tire 13.

The wheel is assembled by inserting the rings 7 and 8 into the tire 13 from opposite sides, after which the rings are placed upon the rim member 3, so that the recesses 16 in the flanges 9 and 10 register with the recesses 15 in the flanges 4 and 5. The bolts 14 are then inserted and nuts 17 screwed up until a proper grip is obtained on the tire. When it is desired to dismantle the wheel the bolts 14 are removed and the rings 7 and 8 withdrawn from the tire 13.

Although but one specific embodiment of this invention has been herein shown and described, it will be understood that numerous details of the construction shown may be altered or omitted without departing from the spirit of this invention as defined by the following claims.

I claim:

1. A wheel comprising a channel-shaped rim member, a pair of rings mounted on said rim member and adapted to support a tire, outwardly disposed flanges formed at the outer edges of said rings, bolts seated in the flanges of said channel-shaped rim member, and inwardly disposed flanges on said rings resting on said bolts inwardly of the heads and nuts thereof, said bolts and nuts being adapted to shift said rings together to clamp the tire between said outwardly disposed flanges.

2. A wheel comprising a channel-shaped rim member, the outwardly disposed flanges thereof having recesses formed in the edges thereof, bolts seated in said recesses, a pair of channel-shaped rings arranged with the flanges thereof opposed to the flanges of said rim member and recessed to receive said bolts, and outwardly disposed flanges formed on the outer edges of said rings, said bolts being adapted to shift said rings toward each other to clamp the tire between said outwardly disposed flanges.

3. A wheel comprising a channel-shaped rim member, the outwardly disposed flanges thereof having recesses formed in the edges thereof, bolts seated in said recesses, a pair of channel-shaped rings arranged with the flanges thereof opposed to the flanges of said rim member and recessed to receive said bolts and hold the same against rotation, and outwardly disposed flanges formed on the outer edges of said rings, said bolts being adapted to shift said rings toward each other to clamp the tire between said outwardly disposed flanges.

Signed at Chicago this 23d day of May 1914.

JOSEPH RENÉ AYOTTE.

Witnesses:
 EDWIN PHELPS,
 M. IRENE HUTCHINGS.

Copies of this patent may be obtained for five cents each, by addressing the "Commissioner of Patents, Washington, D. C."